(12) United States Patent
Tanaka

(10) Patent No.: US 10,452,225 B2
(45) Date of Patent: Oct. 22, 2019

(54) VEHICULAR INPUT DEVICE AND METHOD OF CONTROLLING VEHICULAR INPUT DEVICE

(71) Applicant: TOYOTA JIDOSHA KABUSHIKI KAISHA, Toyota-shi, Aichi-ken (JP)

(72) Inventor: Seiichi Tanaka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/875,719

(22) Filed: Jan. 19, 2018

(65) Prior Publication Data

US 2018/0210626 A1 Jul. 26, 2018

(30) Foreign Application Priority Data

Jan. 23, 2017 (JP) ................. 2017-009862

(51) Int. Cl.
*G06F 3/041* (2006.01)
*G09G 3/36* (2006.01)
(Continued)

(52) U.S. Cl.
CPC .......... *G06F 3/04812* (2013.01); *B60K 35/00* (2013.01); *B60K 37/04* (2013.01); *G01C 21/3664* (2013.01); *G06F 3/038* (2013.01); *G06F 3/03547* (2013.01); *G06F 3/0482* (2013.01); *G06F 3/0485* (2013.01); *G06F 3/04883* (2013.01); *B60K 2370/11* (2019.05); *B60K 2370/143* (2019.05);
(Continued)

(58) Field of Classification Search
CPC ............... B60K 35/00; B60K 37/04; B60K 2350/1004; B60K 2350/1024; B60K 2350/106; B60K 2350/352; B60K 2350/925; G01C 21/3664; G06F 3/03547; G06F 3/04812; G06F 3/0482; G06F 3/0485; G06F 3/04883
See application file for complete search history.

(56) References Cited

U.S. PATENT DOCUMENTS

2005/0091615 A1 4/2005 Suzuki
2012/0216150 A1* 8/2012 Wernecke ............. G06F 3/0481
715/850
(Continued)

FOREIGN PATENT DOCUMENTS

EP 0607727 A1 7/1994
JP H06230916 A 8/1994
(Continued)

*Primary Examiner* — Nelson M Rosario
(74) *Attorney, Agent, or Firm* — Hunton Andrews Kurth LLP

(57) ABSTRACT

A vehicular input device includes a position detection unit, a display unit, and an ECU. The ECU is configured to set, based on a movement amount of a position of an operative input, a determination threshold of the movement amount of the operative input used in determination of movement to a next object from a current object to be smaller than a determination threshold of the movement amount of the operative input used in determination of movement to a next second object from the next object. The ECU is configured to display a selection image that indicates selected objects on the display unit on the current object.

12 Claims, 4 Drawing Sheets

(51) Int. Cl.
    *G06F 3/0481*      (2013.01)
    *B60K 35/00*      (2006.01)
    *G01C 21/36*      (2006.01)
    *G06F 3/0482*      (2013.01)
    *G06F 3/0485*      (2013.01)
    *G06F 3/0488*      (2013.01)
    *G06F 3/0354*      (2013.01)
    *B60K 37/04*      (2006.01)
    *G06F 3/038*      (2013.01)

(52) U.S. Cl.
    CPC .... *B60K 2370/152* (2019.05); *B60K 2370/52* (2019.05); *B60K 2370/774* (2019.05)

(56) References Cited

U.S. PATENT DOCUMENTS

| | | |
|---|---|---|
| 2013/0097564 A1 | 4/2013 | Morikawa et al. |
| 2014/0085238 A1 | 3/2014 | Kim et al. |
| 2015/0185877 A1 | 7/2015 | Watanabe et al. |
| 2015/0205943 A1* | 7/2015 | Takenaka ............ G06F 3/04883 726/17 |
| 2016/0246434 A1 | 8/2016 | Mizunuma et al. |

FOREIGN PATENT DOCUMENTS

| | | |
|---|---|---|
| JP | 2004102497 A | 4/2004 |
| JP | 2015-127870 A | 7/2015 |
| WO | 2015029632 A1 | 3/2015 |

\* cited by examiner

FIG. 3

| MOVEMENT SECTION OF POSITION OF OPERATIVE INPUT | DETERMINATION THRESHOLD |
|---|---|
| FROM CURRENT GUI BUTTON TO NEXT GUI BUTTON | 30% |
| FROM NEXT GUI BUTTON TO SECOND NEXT GUI BUTTON | 60% |
| FROM SECOND NEXT GUI BUTTON TO THIRD NEXT GUI BUTTON | 100% |
| FROM THIRD NEXT OR FURTHER GUI BUTTON TO GUI BUTTON ADJACENT TO THIRD NEXT OR FURTHER GUI BUTTON | 100% |

VEHICULAR INPUT DEVICE AND METHOD OF CONTROLLING VEHICULAR INPUT DEVICE

INCORPORATION BY REFERENCE

The disclosure of Japanese Patent Application No. 2017-009862 filed on Jan. 23, 2017 including the specification, drawings and abstract is incorporated herein by reference in its entirety.

BACKGROUND

1. Technical Field

The present disclosure relates to a vehicular input device and a method of controlling a vehicular input device.

2. Description of Related Art

A control device that displays a first cursor and a second cursor on a display screen is known in the related art. In accordance with an operation performed by a user, the first cursor moves discretely, and the second cursor changes continuously. For example, an item that is selected with the first cursor is displayed on the display screen, and the second cursor continuously moves in accordance with an operation performed by the user. When the movement amount of the second cursor with the first cursor as a reference exceeds a threshold that corresponds to the size of the first cursor, the first cursor moves to an item that is positioned in the movement direction of the second cursor (refer to, for example, Japanese Unexamined Patent Application Publication No. 2015-127870 (JP 2015-127870 A)).

SUMMARY

When an item (object) is selected by using the first cursor and the auxiliary second cursor as described above, the user expects to move the cursor with a small operation amount to the next object after stopping a fingertip or a hand on the item. However, the user may move the fingertip or the hand more than needed because the start of movement of the cursor is not easily recognized, or the movement amount of the fingertip or the hand needed for moving the cursor is not easily recognized. Thus, the user may move the cursor to a second next or third next object.

When the start of movement of the cursor is not easily recognized, or when the movement amount of the fingertip or the hand needed for moving the cursor is not easily recognized, a disadvantage arises in that the cursor (selection image) is not conveniently moved. Such a disadvantage is particularly noticeable when a plurality of objects is linearly disposed.

A vehicular input device that enables a selection image to be conveniently moved by an operative input when a plurality of objects is linearly disposed, and a method of controlling a vehicular input device are provided.

A first aspect of the present disclosure relates to a vehicular input device including a position detection unit that is disposed within a vehicle cabin, has an operative input surface on which a user performs an operative input, and is configured to detect a position of the operative input performed on the operative input surface; a display unit that is disposed within the vehicle cabin and is configured to display at least three objects in a linear arrangement; and an electronic control unit. The objects are selectable by the operative input in a linear arrangement in this order. The electronic control unit is configured to determine, based on a movement amount of the position of the operative input, a current object from the displayed objects, set a determination threshold of the movement amount of the operative input used in determination of movement to the next object from the current object to be smaller than a determination threshold of the movement amount of the operative input used in determination of movement to a second next object from the next object, and display a selection image that indicates selected objects on the display unit on the current object.

According to the first aspect of the present disclosure, the movement amount of the operative input used in determination threshold of movement to the next object from the current object is set to be smaller than the movement amount of the operative input used in determination of movement to the second next object from the second object. Thus, the selection image is conveniently moved to the next object that is nearer to the current object than the second next object. That is, the selection image can be moved to the next object with a small operation amount, and a user can move the selection image as intended.

Accordingly, a vehicular input device that enables a selection image to be conveniently moved by an operative input when a plurality of objects is linearly disposed can be provided.

In the vehicular input device according to the first aspect of the present disclosure, the electronic control unit may be configured to display the objects, and further object in a linear arrangement in this order on the display unit, and set the movement amount of the operative input used in determination of movement to the second next object from the next object to be smaller than the movement amount of the operative input used in determination of movement to the further object from the second next object.

According to the first aspect of the present disclosure, when the further object is present, the movement amount of the operative input used in determination of movement to the second next object from the next object is set to be smaller than the movement amount of the operative input used in determination of movement to the further object from the second next object. Thus, the selection image is conveniently moved to the second next object that is nearer to the current object than the further object. When the movement amount (determination threshold) used in determination of movement to the second next object from the object including the starting point of the operative input is set to a large movement amount, the difference between the movement amount and the movement amount (determination threshold) used in determination of movement to the next object is increased, and the user feels inconvenience in moving to the second next button. Thus, the configuration can further reduce discordance that the user feels.

Accordingly, a vehicular input device that enables a selection image to be conveniently moved by an operative input when a plurality of objects is linearly disposed can be provided.

In the vehicular input device according to the first aspect of the present disclosure, the electronic control unit may be configured to provide an animation, change a size, change color or contrast, or change a movement sound for the selection image displayed on the display unit, when the selection image is moved through the object.

According to the first aspect of the present disclosure, providing different animations, changing the size, changing the color or contrast, or changing the movement sound is performed according to the difference in the movement amount of the operative input used in determination of movement to the object, when the selection image is moved through the object. Thus, the user can recognize the difference in the movement amount of the operative input used in determination of movement to the object, by the difference in animation, size, color or contrast, or movement sound.

Accordingly, a vehicular input device that enables a selection image to be conveniently moved by an operative input when a plurality of objects is linearly disposed can be provided.

In the vehicular input device according to the first aspect of the present disclosure, the selection image may be a cursor that indicates that the object is selected.

According to the first aspect of the present disclosure, selection of the object can be easily recognized by using the cursor as the selection image that selects the object.

Accordingly, a vehicular input device that enables a selection image to be conveniently moved by an operative input when a plurality of objects is linearly disposed can be provided.

In the vehicular input device according to the first aspect of the present disclosure, the position detection unit may be a touchpad, and the display unit may be a display.

In the vehicular input device according to the first aspect of the present disclosure, a determination of a movement section in which the position of the operative input is moved between adjacent objects, and a determination as to whether or not the position of the operative input is moved may be performed by using the determination threshold, and the determination threshold may be increased stepwise away from current position and be set to a reference value in a predetermined object from the current position.

A second aspect of the present disclosure relates to a method of controlling a vehicular input device including a position detection unit that is disposed within a vehicle cabin, has an operative input surface on which a user performs an operative input, and is configured to detect a position of the operative input performed on the operative input surface; a display unit that is disposed within the vehicle cabin and is configured to display at least three objects in a linear arrangement; and an electronic control unit. The objects are selectable by the operative input. The method includes, by the electronic control unit, determining, based on a movement amount of the position of the operative input, a current object from the displayed objects; and by the electronic control unit, setting a determination threshold of the movement amount of the operative input used in determination of movement to the next object from the current object to be smaller than a determination threshold of the movement amount of the operative input used in determination of movement to a second next object from the next object, and displaying a selection image that indicates selected objects on the display unit on the current object.

According to the second aspect of the present disclosure, the movement amount of the operative input used in determination of movement to the next object from the current object is set to be smaller than the movement amount of the operative input used in determination of movement to the second next object from the next object. Thus, the selection image is conveniently moved to the next object that is nearer to the current object than the further object.

Accordingly, a method of controlling a vehicular input device that enables a selection image to be conveniently moved by an operative input when a plurality of objects is linearly disposed can be provided.

The method according to the second aspect of the present disclosure may further include, by the electronic control unit, determining whether the position of the operative input is being moved; by the electronic control unit, determining whether the position of the operative input is stopped for one second or longer, when the electronic control unit determines that the position of the operative input is not being moved; and by the electronic control unit, setting current position of the operative input as a starting point of measuring the movement amount, when the electronic control unit determines that the position of the operative input is stopped for one second or longer.

Accordingly, a vehicular input device that enables a selection image to be conveniently moved by an operative input when a plurality of objects is linearly disposed, and a method of controlling a vehicular input device can be provided.

A third aspect of the present disclosure relates to a vehicular input device including a position detection unit that is disposed within a vehicle cabin, has an operative input surface on which a user performs an operative input, and is configured to detect a position of the operative input performed on the operative input surface; a display unit that is disposed within the vehicle cabin and is configured to display a first object, a second object, and a third object selectable by the operative input in a linear arrangement in this order; and an electronic control unit. The electronic control unit is configured to determine, based on a movement amount of the position of the operative input, whether a corresponding position in the display unit that corresponds to the position of the operative input detected by the position detection unit is present in the first object, the second object, or the third object, set the movement amount of the operative input used in determination of movement to the second object from the first object to be smaller than the movement amount of the operative input used in determination of movement to the third object from the second object, when the position of the operative input is moved such that the corresponding position is moved in a direction of the arrangement from the first object, and display a selection image that selects an objects on the display unit in an overlaid manner on the object in which the corresponding position is present. The object is one of the first object, the second object, and the third object.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram illustrating data of a determination threshold of a corresponding position determination unit;

DETAILED DESCRIPTION OF EMBODIMENTS

Hereinafter, an embodiment to which a vehicular input device and a method of controlling a vehicular input device of the present disclosure are applied will be described.

Embodiment

Figure 1:
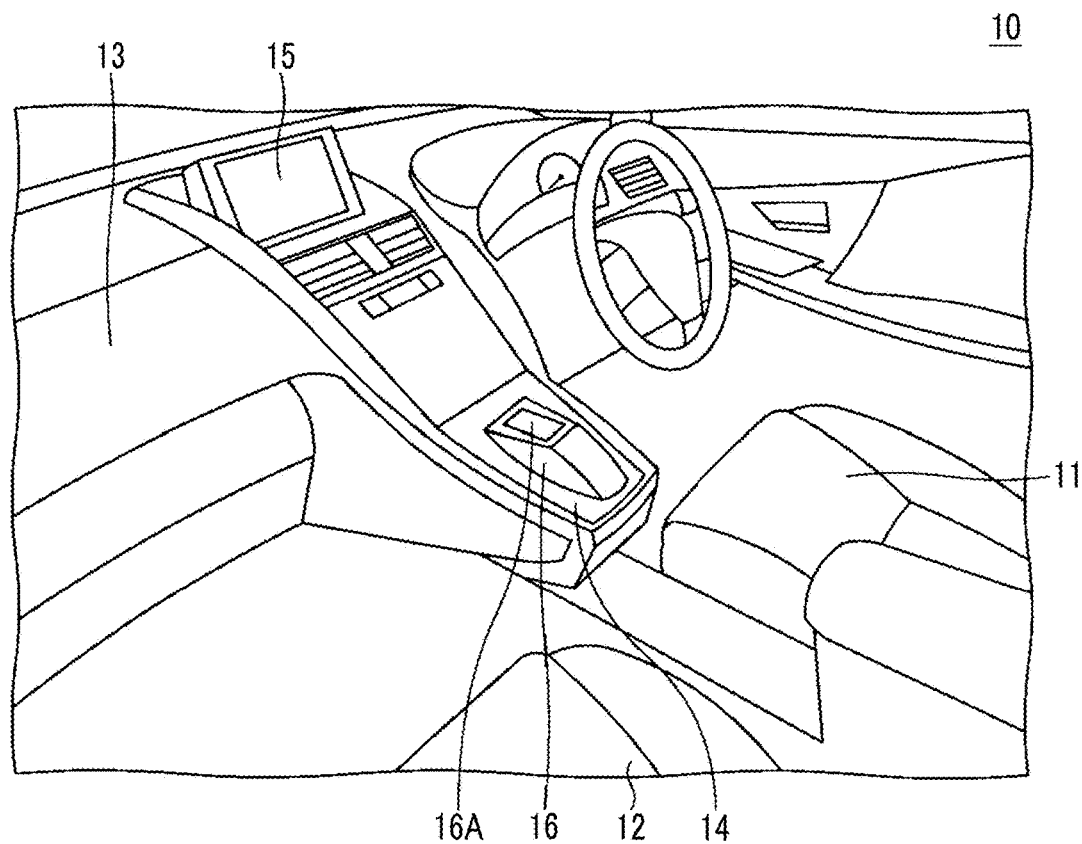
FIG. 1 is a diagram illustrating an interior of a vehicle to which a vehicular input device of an embodiment is applied.

FIG. 1 is a diagram illustrating the interior of a vehicle 10 to which the vehicular input device of the embodiment is applied. In the interior of the vehicle 10, a dashboard 13 is disposed in front of a driver's seat 11 and a passenger seat 12. A center console 14 is disposed across a space from the center of the dashboard 13 to the driver's seat 11 and the passenger seat 12.

A display panel 15 is disposed at the center of the dashboard 13. An input unit 16 is a disposed in front of the center console 14 (a side of the center console 14 near the dashboard 13). The input unit 16 has a touchpad 16A.

The display panel 15 is, for example, a liquid crystal panel and may be other types of display panels than a liquid crystal panel. The display panel 15 can display various screens such as a screen for a navigation system, a screen for setting a traveling mode or the like of the vehicle, a screen for setting an air conditioner, an audio operating screen, and a telephone operating screen.

The touchpad 16A is, for example, a capacitive or resistive type and detects the position (coordinates) where a user touches the surface of the touchpad 16A with a fingertip, a hand, or the like. The touchpad 16A is used when the user selects a cursor displayed on various screens displayed on the display panel 15. The operation of the user touching the surface of the touchpad 16A with a fingertip, a hand, or the like in order to provide an input will be referred to as an operative input.

The vehicular input device of the embodiment includes the display panel 15 and the input unit 16. The movement direction and the movement amount of the operative input performed on the touchpad 16A are associated with the movement direction and the movement amount of the cursor in the display panel 15.

When the user performs the operative input on the touchpad 16A with a fingertip, a hand, or the like, the cursor displayed on the display panel 15 is moved. The cursor is used at the time of selecting various objects such as a graphic user interface (GUI) operator. Examples of the GUI operator include, for example, a button, a slider, and a dial.

A display surface of the display panel 15 has a rectangular shape, and an operating screen of the touchpad 16A also has a rectangular shape. The movement direction of the cursor is configured to match the movement direction of the operative input performed on the touchpad 16A by the user. When the position of the operative input is moved leftward, the cursor displayed on the display panel 15 is also moved leftward. When the position of the operative input is moved rightward, upward (forward of the vehicle), or downward (rearward of the vehicle), the cursor displayed on the display panel 15 is also moved rightward, upward, or downward respectively.

As described above, the cursor displayed on the display panel 15 can be moved by the operative input performed on the touchpad 16A. Various objects such as a GUI operator displayed on the display panel 15 can be selected by moving the cursor. The input provided on the selected object such as a GUI operator can be confirmed by, for example, pressing the touchpad 16A. The input provided by pressing is detected by, for example, a change in the area of the touch with the fingertip, the hand, or the like on the touchpad 16A.

Figure 2:
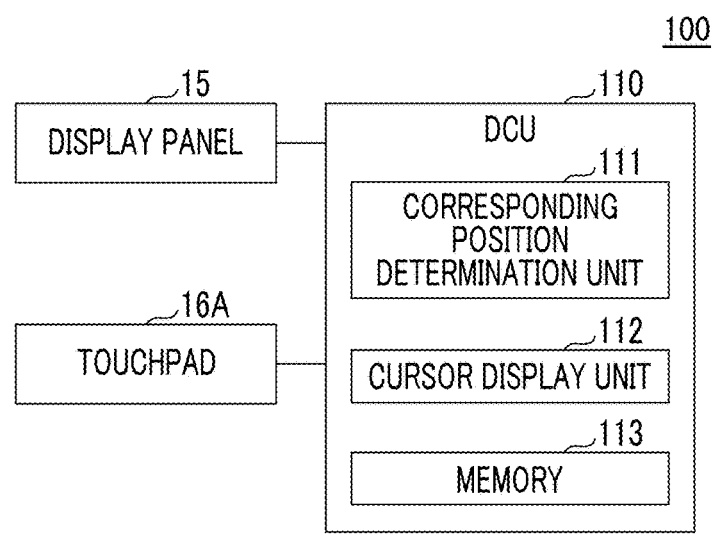
FIG. 2 is a diagram illustrating a configuration of the vehicular input device of the embodiment.

FIG. 2 is a diagram illustrating a configuration of a vehicular input device 100 of the embodiment. The vehicular input device 100 includes a display control unit (DCU) 110, the display panel 15, and the touchpad 16A. The display panel 15 is one example of a display unit, and the touchpad 16A is one example of a position detection unit. The surface of the touchpad 16A is one example of an operative input surface. Hereinafter, objects displayed on the display panel 15 will be assumed to be GUI buttons.

The DCU 110 is one kind of an electronic control unit (ECU) and is a control device that controls an image displayed on the display panel 15. The DCU 110 has a corresponding position determination unit 111, a cursor display unit 112, and a memory 113.

The DCU 110, in the same manner as various ECUs mounted in the vehicle 10, is realized by a computer including, for example, a central processing unit (CPU), a random access memory (RAM), a read-only memory (ROM), a non-volatile memory such as a hard disk, a clock generation unit, an input and output interface, a communication interface, a transmission and reception unit, and an internal bus.

The DCU 110 functions to display various images such as an operator for setting the traveling mode or the like of the vehicle, an air conditioner operator, an audio operator, and a telephone operator, and receive the operative input of the user. The DCU 110 transmits an instruction indicated by the received operative input to various ECUs such as an ECU that sets the traveling mode or the like of the vehicle, and an ECU of the air conditioner. The DCU 110 performs control to display a GUI operator such as a GUI button and various images and the like of the GUI on the display panel 15 (display control). Such a function is realized by the function of the DCU 110 as a display controller.

The corresponding position determination unit 111 calculates a corresponding position in the display panel 15 that corresponds to the position of the operative input detected by the touchpad 16A, based on the movement amount of the position of the operative input detected by the touchpad 16A. The corresponding position determination unit 111 determines any of N (N is an integer greater than or equal to three) or more GUI buttons within which the corresponding position is present.

That is, when N (N is an integer greater than or equal to three) or more GUI buttons are linearly arranged, and the user moves the position of the operative input in the direction of arrangement, the corresponding position determination unit 111 determines whether the corresponding position is moved to the next GUI button, moved to the second next GUI button, or moved to the third next or further GUI button.

The corresponding position determination unit 111 sets the movement amount of the position of the operative input used for determining that the corresponding position is moved to the next GUI button, to be smaller than the movement amount of the position of the operative input used for determining that the corresponding position is moved to the second next GUI button from the next GUI button. The corresponding position determination unit 111 sets the movement amount of the position of the operative input used for determining that the corresponding position is moved to the second next GUI button from the next GUI button, to be smaller than the movement amount of the position of the operative input used for determining that the corresponding position is moved to the third next GUI button from the second next GUI button. Details of the determination process of the corresponding position determination unit 111 will be described below.

The cursor display unit 112 displays a cursor on the display panel 15 in an overlaid manner on the GUI button in which the corresponding position determination unit 111 determines that the corresponding position is present. The cursor is displayed in an overlaid manner on a GUI operator or the like in order to specify or select an object such as a GUI operator displayed on the display panel 15. The cursor is one example of a selection image, and the cursor display unit 112 is one example of a selection image display unit.

When the vehicular input device 100 is powered, the cursor display unit 112 displays the cursor in a predetermined default position or in an overlaid manner on a predetermined default GUI operator or the like. The cursor display unit 112 displays the cursor on the display panel 15 in an overlaid manner on the GUI button within which the corresponding position determination unit 111 determines that the corresponding position calculated by the corresponding position determination unit 111 is present.

When the operative input is performed on the touchpad 16A to move the cursor within the display panel 15, and the operative input is stopped, the cursor that is displayed in an overlaid manner on a GUI operator or the like at the stoppage of the operative input remains displayed in the position thereof by the cursor display unit 112.

The memory 113 stores image data that indicates objects of various types of GUI operators and the like (operators of the vehicle for setting the telephone operator, the air conditioner operator, the audio operator, the GUI operator indicating the traveling mode or the like of the vehicle, and the like) displayed on the display panel 15. The memory 113 is a memory such as a RAM or a hard disk.

FIG. 3 is a diagram illustrating data of a determination threshold of the corresponding position determination unit 111. The table-format data illustrated in FIG. 3 is data in which a movement section in which the cursor is moved between the adjacent GUI buttons by moving the position of the operative input is associated with the determination threshold for determining whether or not the cursor is moved.

In FIG. 3, the movement section of the position of the operative input is divided into a movement section in which the corresponding position corresponds to the next GUI button from the current GUI button, a movement section in which the corresponding position corresponds to the second next GUI button from the next GUI button, a movement section in which the corresponding position corresponds to the third next GUI button from the second next GUI button, and a movement section in which the corresponding position corresponds to the adjacent GUI button, which is the GUI button adjacent to the third next or further GUI button, from the third next or further GUI button.

The determination threshold for determining whether or not the position of the operative input is moved is a threshold at the time of determining whether the position of the operative input is moved to the next GUI button from the current GUI button, to the second next GUI button from the next GUI button, to the third next GUI button from the second next GUI button, or to the adjacent GUI button from the third next or further GUI button. The determination threshold uses a value that is converted into the movement amount of the operative input.

The determination threshold in the case of movement to the third next GUI button from the second next GUI button, and in the case of movement to the adjacent GUI button from the third next or further GUI button is set to 100%.

The determination threshold in the case of movement to the next GUI button from the current GUI button, and in the case of movement to the second next GUI button from the next GUI button is set to 30% and 60% respectively.

That is, the determination threshold in the case of movement to the third next GUI button from the second next GUI button, and in the case of movement to the adjacent GUI button from the third next or further GUI button is set to 100% as a reference. The determination threshold in the case of movement to the next GUI button from the current GUI button is reduced to 30%. The determination threshold in the case of movement to the second next GUI button from the next GUI button is reduced to 60%.

Figure 4:
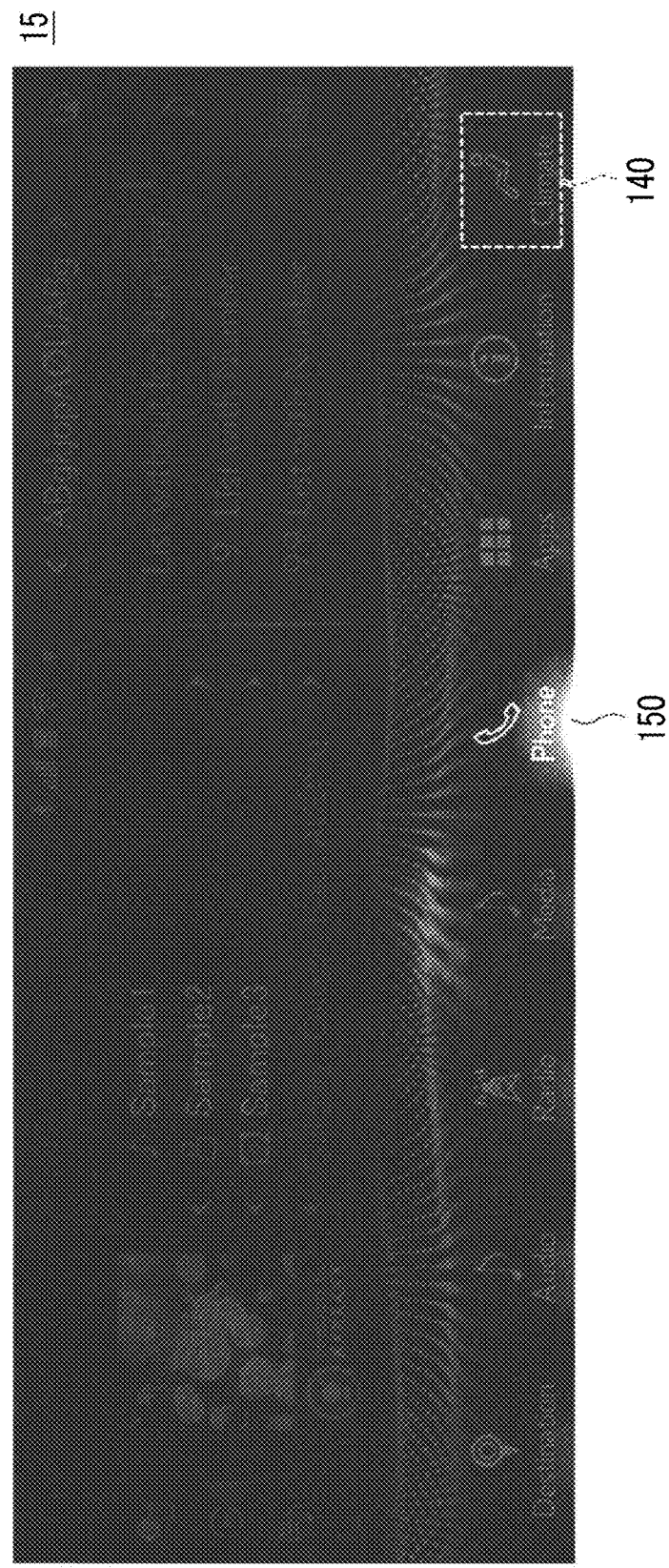
FIG. 4 is a diagram illustrating one example of a cursor.

FIG. 4 is a diagram illustrating one example of the cursor. In FIG. 4, GUI buttons 140 of destination (Destination), audio (Audio), radio (Radio), media (Media), telephone (Phone), applications (Apps), information (Information), and air conditioner (Climate) are displayed on the lower side of the display panel 15. A song title and the like are displayed dimly on the upper side of the eight GUI buttons.

In FIG. 4, a cursor 150 points to the GUI button 140 of telephone (Phone) among the eight GUI buttons in a state in which the operative input is not being performed on the touchpad 16A. The cursor 150 causes a lower side part of the GUI button 140 of telephone (Phone) to be displayed brightly. The GUI button 140 of telephone (Phone) to which the cursor 150 points is displayed brightly, and the other seven GUI buttons 140 are displayed dimly.

Each of the eight GUI buttons 140 is configured with a combination of a mark and a text representing each function. For example, the GUI button 140 of telephone (Phone) is configured with a telephone mark and the text Phone. The GUI button 140 of air conditioner (Climate) is configured with a mark of a person on a seat and the text Climate.

A region that functions as each GUI button 140 is a region that includes each mark and each text. For example, the GUI button 140 of air conditioner (Climate) is a region that includes a mark of a person on a seat and the text Climate, and has a rectangular shape illustrated by a broken line. The same applies to the other seven GUI buttons 140.

The mark and the text of each GUI button 140 are not inversely displayed between a state in which each GUI button 140 is not selected with the cursor 150 (the cursor 150 is not overlaid) and a state in which each GUI button 140 is selected with the cursor 150 (the cursor 150 is overlaid), and the brightness of the mark and the text of each GUI button 140 is changed.

The cursor 150 causes each GUI button 140 to be displayed brightly in red having high brightness. The transparency of the cursor 150 is set such that the mark and the text of the GUI button 140 are seen through the cursor 150. The transparency is set to be increased toward the upper side of the GUI button 140, to approximately 100%, and is set to be gradually decreased toward the lower side of the GUI button 140. The transparency is approximately 0% at the lower end of the GUI button 140.

Thus, the cursor 150 is disposed to be overlaid on the lower side part of the GUI button 140 of telephone (Phone) and allows the upper side of the GUI button 140 of telephone (Phone) to be displayed. The cursor 150 causes the lower side of the GUI button 140 to be displayed brightly in red. The cursor 150 does not cover (hide) the entirety of the GUI button 140 of telephone (Phone) (both of the telephone mark and the text Phone), and the lower side of the GUI button 140 is displayed.

Figure 5:
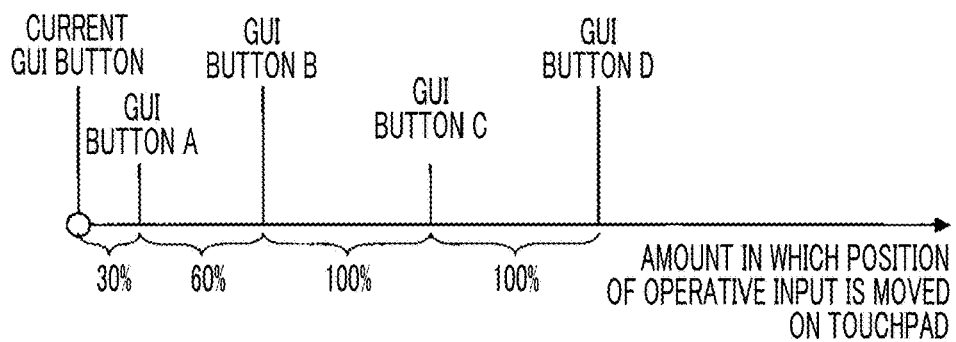
FIG. 5 is a diagram illustrating the determination threshold used by the corresponding position determination unit.

FIG. 5 is a diagram illustrating the determination threshold used by the corresponding position determination unit 111. A GUI button that currently includes the corresponding position (current GUI button), a next GUI button A, a second next GUI button B, a third next GUI button C, and a fourth next GUI button D are illustrated as the N or more GUI buttons.

The current GUI button, the next GUI button A, the second next GUI button B, the third next GUI button C, and the fourth next GUI button D are linearly arranged as the GUI buttons 140 illustrated in FIG. 4. The horizontal axis in FIG. 5 is the direction of arrangement of the five GUI buttons, and denotes the movement amount of the position of the operative input on the touchpad 16A.

As illustrated in FIG. 5, the determination threshold in the case of movement to the next GUI button from the current GUI button is set to 30%. The determination threshold indicates the ratio of the movement amount of the position of the operative input to the reference value (100%).

The determination threshold in the case of movement to the second next GUI button from the next GUI button is set to 60%. The determination threshold in the case of movement to the third next GUI button from the second next GUI button, and in the case of movement to the adjacent GUI button from the third next or further GUI button is set to the reference value (100%).

As described above, the determination threshold that is used in determination of movement by the corresponding position determination unit 111 is set to be relatively small (short in distance) for the relatively nearby GUI buttons A, B from the current corresponding position. The determination threshold is set to be relatively large (long in distance) for the relatively far GUI buttons C, D from the current corresponding position.

When the determination threshold is not relatively decreased for the relatively nearby GUI button from the current corresponding position, and the determination threshold is set to 100% even for the relatively nearby GUI buttons A, B from the current corresponding position, the movement amount of the fingertip or the hand needed for moving the cursor is not easily recognized, or the start of movement of the cursor is not easily recognized. Thus, the user moves the fingertip or the hand more than needed, and may move the cursor to the GUI button B, C, or D when the user wants to move the cursor to the GUI button A from the current corresponding position. Similarly, the user may move the cursor to the GUI button C or D when the user wants to move the cursor to the GUI button B from the current corresponding position.

The vehicular input device 100 of the embodiment sets the determination threshold used in determination of movement by the corresponding position determination unit 111 to be relatively small (short in distance) for the relatively nearby GUI buttons A, B from the current corresponding position. Thus, the cursor is moved very conveniently to the relatively nearby GUI buttons A, B from the current corresponding position.

Setting the determination threshold in the case of movement to the second next GUI button from the next GUI button to 60% means that the determination threshold is set to an intermediate value between the determination threshold (30%) in the case of movement to the next GUI button from the current GUI button, and the determination threshold (100%) in the case of movement to the third next GUI button from the second next GUI button, and in the case of movement to the adjacent GUI button from the third next or further GUI button. By setting the determination threshold to such an intermediate value and increasing the determination threshold stepwise, the cursor is moved more conveniently, and usability is improved.

Figure 6:
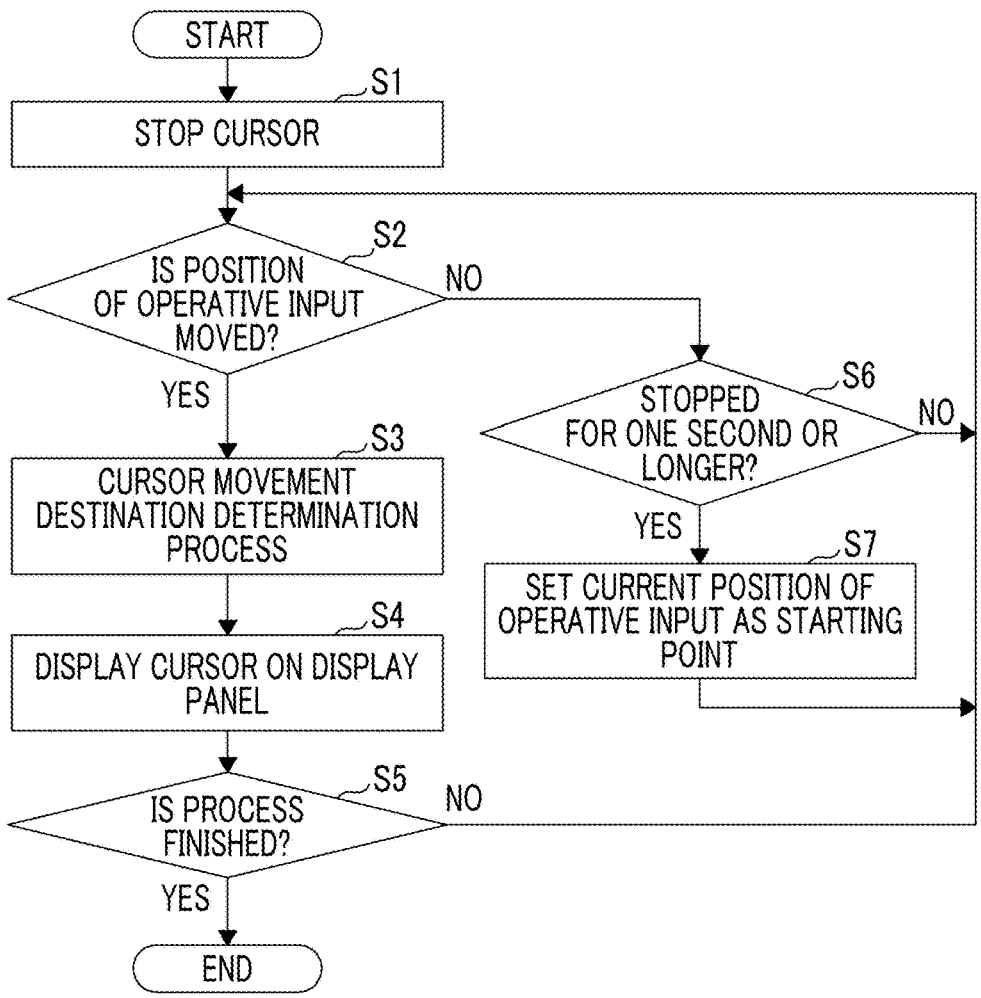
FIG. 6 is a flowchart illustrating a process executed by the corresponding position determination unit of a DCU.

FIG. 6 is a flowchart illustrating a process executed by the corresponding position determination unit 111 of the DCU 110.

When an ignition switch of the vehicle is set to an ON state, the DCU 110 starts the process (START).

The corresponding position determination unit 111 first stops the cursor 150 (step S1).

The corresponding position determination unit 111 determines whether or not the position of the operative input is being moved (step S2). Coordinates that indicate the position of the operative input before the start of movement of the position of the operative input are retained in the memory 113 as the coordinates of a starting point of measuring the movement amount of the position of the operative input.

When the corresponding position determination unit 111 determines that the position of the operative input is being moved (YES in S2), the corresponding position determination unit 111 determines the movement destination of the cursor 150 in accordance with the movement amount of the position of the operative input by using the table-format data of the determination threshold illustrated in FIG. 3 (step S3). In step S3, the GUI button 140 on which the cursor 150 is to be displayed in an overlaid manner is determined. The movement amount is the movement amount in which the fingertip moves from the starting point of the operative input performed on the touchpad 16A to the point detected by the touchpad 16A after moving in contact with the touchpad 16A. The starting point is the point at which the operative input is started on the touchpad 16A. When the fingertip with which the operative input is performed on the touchpad 16A is moved away from the touchpad 16A in the middle of a movement (the operative input is stopped), the coordinates of the starting point are reset.

The corresponding position determination unit 111 displays the cursor 150 on the display panel 15 in an overlaid manner on the GUI button 140 determined in step S3 (step S4).

The corresponding position determination unit 111 determines whether or not the process is finished (step S5). The process is finished when, for example, the ignition switch is set to an OFF state.

When the corresponding position determination unit 111 determines that the process is not finished (NO in S5), the flow of the process returns to step S1. When the corresponding position determination unit 111 determines that the process is finished (YES in S5), the corresponding position determination unit 111 finishes the series of processes (END).

When the corresponding position determination unit 111 in step S2 determines that the position of the operative input is not being moved (NO in S2), the corresponding position determination unit 111 determines whether or not the position of the operative input is stopped for one second or longer (step S6).

When the corresponding position determination unit 111 determines that the position of the operative input is stopped for one second or longer (YES in S6), the corresponding position determination unit 111 sets the current position of the operative input as the starting point of measuring the movement amount of the position of the operative input (step S7). Accordingly, the coordinates that indicate the current position of the operative input are retained in the memory 113 as the coordinates of the starting point of measuring the movement amount of the position of the operative input.

When the corresponding position determination unit 111 finishes the process of step S6, the flow of the process returns to step S2.

When the corresponding position determination unit 111 in step S6 determines that the position of the operative input is not stopped for one second or longer (NO in S6), the flow of the process returns to step S2.

As described heretofore, the vehicular input device 100 sets the determination threshold for the movement amount of the operative input between the GUI buttons 140 to be lower than the reference value (100%) as the movement destination of the operative input is nearer to the current GUI button. Thus, the cursor 150 is moved very conveniently to the relatively nearby GUI button 140 from the current corresponding position.

Particularly, when the user wants to move the cursor 150 promptly to the relatively nearby GUI button 140 from the current corresponding position, the user can move the cursor 150 very conveniently and can have less occurrence of a situation in which the cursor 150 passes through the desired GUI button 140.

When the user wants to move the cursor 150 to the far GUI button 140 from the current corresponding position, the user may move the position of the operative input comparatively significantly. Thus, the user can securely move the cursor 150 to the desired GUI button 140.

In the description heretofore, the determination threshold in the case of movement to the next GUI button from the current GUI button is set to 30%. The determination threshold in the case of movement to the second next GUI button from the next GUI button is set to 60%. The determination threshold in the case of movement to the third next GUI button from the second next GUI button, and in the case of movement to the adjacent GUI button from the third next or further GUI button is set to the reference value (100%).

However, such setting of the determination threshold is for illustrative purposes. For example, the determination threshold of 30% or 60% described herein may be changed to an appropriate value in accordance with specifications or the like of the touchpad 16A or the display panel 15.

The determination threshold in the case of movement to the second next GUI button from the next GUI button may be set to 100%, and the determination threshold in the case of movement to the next GUI button from the current GUI button may be set to 50%.

The determination threshold in the case of movement to the third next GUI button from the second next GUI button, and in the case of movement to the adjacent GUI button from the third next or further GUI button may be set to be lower than the reference value. In such a case, the determination threshold may be increased stepwise away from the current GUI button, and the determination threshold may be increased to the reference value (100%) in a certain GUI button 140.

When the position of the cursor 150 is moved by moving the position of the operative input, different animations may be provided with the cursor 150 according to the difference in determination threshold. Alternatively, the color or contrast of the cursor 150 may be changed with different patterns, or different sounds may be generated. By doing so, the user recognizes the difference in determination threshold through vision or hearing. Such control may be performed by the corresponding position determination unit 111. Instead of the corresponding position determination unit 111, a display controller that performs such control may be disposed inside the DCU 110.

The vehicular input device 100 keeps the cursor 150 displayed in a state in which the operative input is not being performed on the touchpad 16A. Thus, when the user moves the hand or the fingertip away from the touchpad 16A, moves the line of sight from the display panel 15, and then, views the display panel 15 again, the cursor 150 is present in a position before the user moves the line of sight from the display panel 15.

Accordingly, the user can recognize the cursor 150 again in a very short time period, and the possibility of losing the cursor 150 out of sight is significantly decreased, compared to when the cursor is not displayed as in a device in the related art.

While the vehicular input device and the method of controlling a vehicular input device according to the exemplary embodiment of the present disclosure are described heretofore, the present disclosure is not limited to the specifically disclosed embodiment. Various modifications or changes can be made to an extent not departing from the claims.

What is claimed is:

1. A vehicular input device comprising:
a position detection unit that is disposed within a vehicle cabin, has an operative input surface on which a user performs an operative input, and is configured to detect a position of the operative input performed on the operative input surface;
a display unit that is disposed within the vehicle cabin and is configured to display at least three objects in a linear arrangement, the objects being selectable by the operative input; and
an electronic control unit configured to
determine, based on a movement amount of the position of the operative input, a current object from the displayed objects,
set a determination threshold of the movement amount of the operative input used in determination of movement to the next object from the current object to be smaller than a determination threshold of the movement amount of the operative input used in determination of movement to a second next object from the next object, and
display a selection image that indicates selected objects on the display unit on the current object.

2. The vehicular input device according to claim 1, wherein the electronic control unit is configured to display the objects, and a further object in a linear arrangement in this order on the display unit, and set the movement amount of the operative input used in determination of movement to the second next object from the next object to be smaller than the movement amount of the operative input used in determination of movement to the further object from the second next object.

3. The vehicular input device according to claim 1, wherein the electronic control unit is configured to provide an animation, change a size, change color or contrast, or change a movement sound for the selection image displayed on the display unit, when the selection image is moved through the object.

4. The vehicular input device according to claim 1, wherein the selection image is a cursor that indicates that the object is selected.

5. The vehicular input device according to claim 1, wherein the position detection unit is a touchpad, and the display unit is a display.

6. The vehicular input device according to claim 1, wherein a determination of a movement section in which the position of the operative input is moved between adjacent objects, and a determination as to whether the position of the operative input is moved are performed by using the determination threshold, and the determination threshold is increased stepwise away from current position and is set to a reference value in a predetermined object from the current position.

7. A method of controlling a vehicular input device including a position detection unit that is disposed within a vehicle cabin, has an operative input surface on which a user performs an operative input, and is configured to detect a position of the operative input performed on the operative input surface, a display unit that is disposed within the vehicle cabin and is configured to display at least three objects in a linear arrangement, the objects being selectable by the operative input, and an electronic control unit, the method comprising:

by the electronic control unit, determining, based on a movement amount of the position of the operative input, a current object from the displayed objects; and by the electronic control unit, setting a determination threshold of the movement amount of the operative input used in determination of movement to the next object from the current object to be smaller than a determination threshold of the movement amount of the operative input used in determination of movement to a second next object from the next object, and displaying a selection image that indicates selected objects on the display unit on the current object.

8. The method according to claim 7, further comprising:
by the electronic control unit, determining whether the position of the operative input is being moved;
by the electronic control unit, determining whether the position of the operative input is stopped for one second or longer, when the electronic control unit determines that the position of the operative input is not being moved; and
by the electronic control unit, setting current position of the operative input as a starting point of measuring the movement amount, when the electronic control unit determines that the position of the operative input is stopped for one second or longer.

9. A vehicular input device comprising:
a position detection unit that is disposed within a vehicle cabin, has an operative input surface on which a user performs an operative input, and is configured to detect a position of the operative input performed on the operative input surface;
a display unit that is disposed within the vehicle cabin and is configured to display a first object, a second object, and a third object selectable by the operative input in a linear arrangement in this order; and
an electronic control unit configured to
determine, based on a movement amount of the position of the operative input, whether a corresponding position in the display unit that corresponds to the position of the operative input detected by the position detection unit is present in the first object, the second object, or the third object,
set the movement amount of the operative input used in determination of movement to the second object from the first object to be smaller than the movement amount of the operative input used in determination of movement to the third object from the second object, when the position of the operative input is moved such that the corresponding position is moved in a direction of the arrangement from the first object, and
display a selection image that selects an objects on the display unit in an overlaid manner on the object in which the corresponding position is present, the object being one of the first object, the second object, and the third object.

10. The vehicular input device according to claim 1, wherein the movement is horizontal movement.

11. The method of controlling a vehicular input device according to claim 7, wherein the movement is horizontal movement.

12. The vehicular input device according to claim 9, wherein the movement is horizontal movement.

* * * * *